March 10, 1970     MITSUAKI MOCHIZUKI     3,499,217

METHOD OF MAKING A TEMPERATURE PROBE

Filed July 26, 1967

INVENTOR
Mitsuaki Mochizuki
By Leonard S. Knox
Atty

United States Patent Office 3,499,217
Patented Mar. 10, 1970

3,499,217
METHOD OF MAKING A TEMPERATURE PROBE
Mitsuaki Mochizuki, Kobe, Japan, assignor to Okazaki Manufacturing Company, Kobe, Japan
Filed July 26, 1967, Ser. No. 656,205
Claims priority, application Japan, Aug. 12, 1966, 41/53,183
Int. Cl. H01c 7/04
U.S. Cl. 29—612
6 Claims

ABSTRACT OF THE DISCLOSURE

A temperature probe incorporating a temperature-sensitive element for translating a temperature into a voltage to actuate or control some exterior means in accordance with an instantaneous temperature or change therein. The temperature-sensitive element is ruggedized by enclosure in a rigid sheath together with a suitable dielectric refractory to support and electrically insulate the element and sheath. The disclosure relates to a method of fabricating a probe as aforesaid in which the temperature-sensitive element, during assembly, is properly located and protected against damage.

---

The present invention is concerned with a temperature probe employing a resistor to determine the temperature of an object, a gaseous environment, a mass of material, and so forth, by measuring the electrical resistance of the resistor as affected by a change in temperature. The technological requirements expected to be fulfilled in the manufacture and use of this type of probe have been invulnerability of the resistor, especially of a thermistor, to thermal attack to which it may be subjected during assembly; improved insulation and high resistance to vibration; and sufficient pliability to allow the assembly to be bent with ease to conform to special applications. From the commercial point of view the invention allows a wider choice of materials for the sheath.

In prior methods the high temperature to which the resistor was subjected during a welding step could easily damage the element and the electrical connections within the sheath. Furthermore, filling the voids in the exterior sheath with an insulator without damage to the element and connections and the maintenance of suitable insulation constituted such a delicate operation that it had to be done for the most part by careful hand work.

In accordance with the invention, welding steps following positioning of the sening unit in the sheath are avoided; delivery to, and compaction of the pulverulent refractory in the sheath and about the sensing unit is accomplished in a novel manner; the refractory may be used in its dry powder form; better insulation resistance is obtained, and mechanization of many of the steps of assembly is possible, thus increasing efficiency and diminishing manufacturing cost.

Further objects and advantages will become apparent from the ensuing description which, taken with the accompanying drawing, discloses a preferred mode of carrying the principles of the invention into practice.

Generally regarded, the invention, in one aspect, comprehends the method of manufacture of a temperature probe in which the active element, which may be a resistor or thermocouple, is encased in a sheath, the end whereof adjacent the element is hermetically closed by means of a welded or brazed cap or other closure, the other end providing an exit for the leads from the element and which end is also hermetically sealed. The sheath is generally of metal, e.g. stainless steel, although for special applications the same may be copper, aluminum or brass. In order to protect the leads from the element it is preferred to thread the same through a string of ceramic beads, as is well known. In accordance with the invention method a suitable blank of tubular material is swaged at one end over some portion of its length, this portion being essentially coextensive with, or slightly longer than the sensing element. That end of the sheath is then closed, e.g. by means of a welded disc or cap and the string comprising the element, its leads and the beads thereover, located in the sheath. The string and sheath are desirably assembled in a vertical position and the string fixed in such vertical position as will assure the proper relation of the sensing element with respect to the inner face of the closed end of the sheath. Following this step, and while maintaining the parts vertical, a funnel is positioned within the sheath. This funnel has an outer shell conforming to the interior of the sheath and is a slip fit therein, and a centrally positioned tube which is a slip fit to position, support and protect the string during the placement of the pulverulent dielectric refractory. If desired the funnel may be in two separate parts. In the alternative only the central tube may be employed. The refractory is now poured into the annular space between the two tubes or the space between the sheath and inner tube, which assures that an adequate quantity thereof will be deposited at the innermost, closed end of the sheath and the pouring is continued until the sheath is nearly full. As pouring proceeds the funnel or tube is withdrawn at essentially the same rate as the level of the refractory rises. Following this a suitable plug is inserted in the sheath on top of the refractory material, this plug having suitable apertures to pass the leads. The assembly as thus constituted is then swaged to uniform diameter, which is the same as the initially swaged portion, to yield the finished product.

Figure 1:
FIG. 1 shows a blank of sheath material prior to the initial swaging step.

Adverting to the drawing there are shown various views representing steps in the process of the invention. FIG. 1 shows a blank section of tubing 1 of a length calculated to yield some pre-determined finished length following swaging to a smaller diameter. If the finished length is to be accurate suitable allowance may be made for trimming. The internal diameter and wall thickness are so selected to allow carrying out of succeeding steps in an expeditious and economical manner. The material of the sheath is of some suitable metal having the malleability required for swaging as well as bending of the finished probe, it being noted that probes of the type here considered are frequently bent to adapt them to a particular environment. Stainless steel, copper, aluminum and brass are among metals sometimes employed.

Figure 2:
FIG. 2 shows the same following the initial swaging step.

First a portion 3 at one end of the blank is swaged to some smaller external diameter (FIG. 2). The diameter and length are so selected as to provide, when closed, a pocket which will accommodate the sensing element as well as a discrete annular body of refractory material between the element and the interior surface of the portion 3.

After such preliminary swaging the open end, viz the left end, is closed (FIG. 3) by means of a disc 4 or equivalent, which is welded into place in order to provide a hermetic seal. Alternatively, the sheath as shown in FIG. 3 may be deep-drawn, which will eliminate the need for the separate disc 4 and the securement thereof.

Figure 4:
FIG. 4 shows the resistor and its leads together with the bead insulators.
Figure 5:
FIG. 5 is an enlarged view of a portion FIG. 4.

FIG. 4 shows a preferred mode of providing an assembly of the sensing element, leads and insulators in a form to be incorporated with the sheath. In this example, the resistance element 2, e.g. a resistance wire wound on a dielectric support, has leads 5 which are threaded through a plurality of ceramic beads 6 (FIG. 5) whereby the lead wires are given support and protection and are retained in non-contacting relation. Within the present concept the element 2 may be a thermocouple.

Figure 3:
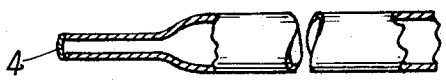
FIG. 3 shows the swaged end of the tube closed to define a pocket to receive the sensing element.
Figure 6:
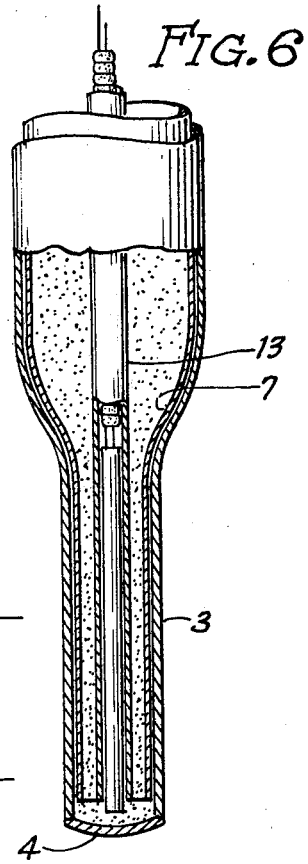
FIG. 6 is a view showing an intermediate stage of assembly.

Turning now to FIG. 6 the partially processed sheath of FIG. 3 is supported in a fixed vertical position and the assembly of FIG. 4 carefully located therein. It is to be noted that the length of the reduced portion 3 is at least as long as the element 2, and is preferably slightly longer. Further, that the bottom end of the sensing element will be at some pre-selected distance from the disc 4. The string comprising the several components of FIG. 4 is suspended in such fixed relation with the sheath.

Figure 9:
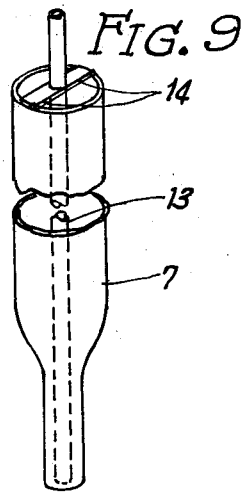
FIG. 9 is a perspective view of a special funnel.

While the sheath and assembly of FIG. 4 remain supported in the manner just described two tubes are located as follows; one tube 7 conforming to the interior of the pre-swaged sheath of FIG. 2 is slid into place and a second tube 13 is slid into place to surround the string of FIG. 4. Obviously the fit of the tube 13 will be such as to permit placement and withdrawal thereof without the hazard of injuring the string. Since optimum concentricity between the string and sheath is a prerequisite this may be done by fixing the respective outer ends of the tubes. This result is conveniently achieved by bridging the two as at 14 in FIG. 9 to constitute, so to speak, a two-part funnel.

While the parts are thus relatively positioned (FIG. 6) the pulverulent refractory, e.g. MgO, is poured in through the annular space between the tubes 7 and 13. As pouring progresses the tubes are carefully withdrawn at a rate calculated to allow the refractory a sufficient opportunity to settle densely in the space between the sheath and string. By reason of the centering action of the tube 7 the refractory will be deposited in a uniform annulus and, if withdrawal of the guide tubes is maintained at a sufficiently slow rate, i.e. substantially equal to the rate at which the level of the refractory rises, voids are avoided.

Figure 7:
FIG. 7 shows a further stage of assembly.
Figure 8:
FIG. 8 shows a later stage.

After the sheath has received the full quota of refractory the upper end is closed by means of a plug 8 (FIG. 7) having bores for passage of the lead wires 5. This plug may be pariffin wax, rubber or other suitable dielectric substance which will also respond readily to reduction in size pursuant to the second phase of swaging in which the larger diameter sheath portion is reduced to the smaller diameter of FIG. 8. Inasmuch as the swaging force is applied uniformly around the circumference the refractory is compacted into a dense matrix without altering the established concentricity of the string and sheath. Suitable anchoring of the leads 5 to terminals may be in accordance with well-known practice.

Figure 10:
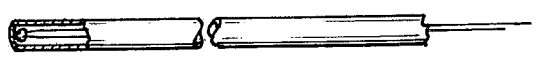
FIG. 10 is a view similar to FIG. 8 of a thermistor used as the sensing element.

FIG. 10 shows a modification in which a thermistor 15 is the temperature-sensitive element. Otherwise the structure and method of manufacturing the same are as described above.

From the above description of the method of manufacture, the following advantages will have become apparent:

(1) Because the probe has not been subjected to welding, those characteristics which might have otherwise been deleteriously affected by heat remain unchanged.

(2) Because the refractory is in a dry powdered state, which offers better immunity to contamination, it will have increased dielectric strength as well as the other advantages stated in (3) below. Previously the MgO was mixed with water containing a bonding material and other impurities before being poured into the sheath. These impurities, and entrapped air often lowered the insulation resistance.

(3) Because the sheath is reduced in diameter after it has been filled with the refractory, this latter becomes very compact, the degree of compactness being proportionate to the original diameter and the reduced diameter. The resistance of the temperature sensing element to vibration is so high that even the very violent vibration to which the assembly is subjected during final swaging, can do no harm. This violent vibration serves to render the refractory uniform in density throughout the sheath tube, including the zone of the initially swaged portion.

(4) Because the insulator used is in its dry state, little time is required for final drying, while older types require a long time to desiccate the wet insulating material.

(5) The wide choice of material for the sheath makes it possible to lower the production cost.

(6) Because the deposition of the refractory can be done while the tube has a large diameter this stage is less critical.

(7) Owing to ruggedization of the sensing element as well as the compactly packed refractory, the whole assembly is highly resistant to vibration.

(8) It is possible to make probes according to the invention in very small diameters which, in turn, allows easier bending.

I claim:
1. The method of manufacturing a temperature probe which includes an assembly of a sensing element and electrically-insulated leads extending therefrom, a sheath to house the assembly and a refractory material insulating and supporting the assembly in the sheath which comprises:
 (a) providing an open-ended tubular blank of some pre-determined length having a diameter substantially larger than the sensing element to constitute the ultimate sheath;
 (b) reducing an end portion of the blank to some diameter to receive the sensing element, the reduced end portion having a length substantially coextensive with the element;
 (c) closing said end portion to define, with the reduced end portion, a pocket;
 (d) locating the assembly within the partially-formed sheath with the sensing element in the pocket;
 (e) positioning the partially-formed sheath and the therein-contained assembly vertically with the pocket downwardly;
 (f) providing a tube having a slip fit over the assembly;
 (g) locating the tube over the assembly to provide interim protection therefor and, while maintaining said tube concentric with the partially-formed sheath, gradually depositing a pulverulent, dielectric refractory in the annular space between the tube and partially-formed sheath and concurrently withdrawing the tube;
 (h) closing the other end of the partially-formed sheath; and
 (i) deforming the partially-formed sheath to a smaller diameter to compact the refractory therewithin.

2. The method of manufacturing a temperature probe which includes an assembly of a sensing element and electrically insulated leads extending therefrom, a sheath to house the assembly and a refractory material insulating and supporting the assembly in the sheath which comprises:
 (a) providing an open-ended tubular blank of some pre-determined length having a diameter substantially larger than the sensing element to constitute the ultimate sheath;

(b) reducing an end portion of the blank to some diameter to receive the sensing element, the reduced end portion having a length substantially coextensive with the element;

(c) closing said end portion to define, with the reduced end portion, a pocket;

(d) locating the assembly within the partially-formed sheath with the sensing element in the pocket;

(e) positioning the partially-formed sheath and the therein-contained assembly vertically with the pocket downwardly;

(f) providing a tube having a slip fit over the assembly;

(g) locating the tube over the assembly;

(h) maintaining said tube concentric with the partially-formed sheath;

(i) providing a second tube conforming to the interior of the partially-formed sheath and having a slip fit therein;

(j) locating the second tube within the partially-formed sheath;

(k) gradually depositing a pulverulent, dielectric refractory in the annular space between the two tubes while gradually withdrawing the tubes from within the partially-formed sheath;

(l) closing the other end of the partially-formed sheath; and (m) deforming the partially-formed sheath to a smaller diameter to compact the refractory therewithin.

3. The method of manufacturing a temperature probe which includes an assembly of a sensing element and electrically-insulated leads extending therefrom, a sheath to house the assembly and a refractory material insulating and supporting the assembly in the sheath which comprises:

(a) providing an open-ended tubular blank of some pre-determined length having a diameter substantially larger than the sensing element to constitute the ultimate sheath;

(b) reducing an end portion of the blank to some diameter to receive the sensing element, the reduced end portion having a length substantially coextensive with the element;

(c) closing said end portion to define, with the reduced end portion, a pocket;

(d) locating the assembly within the partially-formed sheath with the sensing element in the pocket;

(e) positioning the partially-formed sheath and the therein-contained assembly vertically with the pocket downwardly;

(f) providing a unit of two concentric tubes, the inner one whereof has a slip fit over the assembly and the outer one whereof conforms to the interior of the partially-formed sheath and has a slip fit therein;

(g) locating the unit within the partially-formed sheath;

(h) gradually depositing a pulverulent, dielectric refractory in the annular space between the two tubes while gradually withdrawing the unit from within the partially-formed sheath;

(i) closing the other end of the sheath;

(j) deforming the partially-formed sheath to a smaller diameter to compact the refractory therewithin.

4. The method of manufacturing a temperature probe which includes an assembly of a sensing element and electrically insulated leads extending therefrom, a sheath to house the assembly and a refractory material insulating and supporting the assembly in the sheath which comprises:

(a) providing an open-ended tubular blank of some pre-determined length having a diameter substantially larger than the sensing element to constitute the ultimate sheath;

(b) reducing an end portion of the blank to some diameter to receive the sensing element, the reduced end portion having a length substantially coextensive with the element;

(c) closing said end portion to define, with the reduced end portion, a pocket;

(d) positioning the partially-formed sheath with its axis vertically;

(e) providing a unit for two concentric tubes, the inner one whereof is dimensioned to receive the assembly with a slip fit and the outer one whereof conforms to the interior of the partially-formed sheath and has a slip fit therein;

(f) locating the unit within the partially-formed sheath;

(g) positioning the assembly of sensing element and its insulated leads within the inner tube with the sensing element opposite the reduced end portion of the partially-formed sheath;

(h) gradually depositing a pulverulent, dielectric refractory in the annular space between the tubes while gradually extracting the unit from within the partially-formed sheath;

(i) closing the other end of the partially-formed sheath; and (j) deforming the partially-formed sheath to a smaller diameter to compact the refractory therewithin.

5. The method of assembling a temperature probe which includes a sensing element, a plurality of insulated electrical leads extending from said element and a tubular sheath housing the element and leads comprising:

(a) providing the sheath with one end closed;

(b) positioning the element and leads within the sheath;

(c) providing a tube coextensive in length with the element and at least that portion of the leads within the confines of the partially-formed sheath and having a slip fit thereover;

(d) locating the tube concentrically with the sheath; and (e) while maintaining such concentricity depositing pulverulent refractory material in the annular space between the tube and sheath while withdrawing the tube from the sheath.

6. The method in accordance with claim 5 further characterized by the following additional steps:

(a) closing the other end of the sheath; and (b) deforming the sheath to a smaller diameter to compact the refractory therewithin.

References Cited

UNITED STATES PATENTS

| | | | |
|---|---|---|---|
| 2,690,490 | 9/1954 | Charbonneau | 29—615 X |
| 3,045,326 | 7/1962 | Griffiths | 29—612 |
| 3,267,733 | 8/1966 | Chambers. | |
| 3,339,164 | 8/1967 | Landis et al. | 338—28 X |
| 3,434,207 | 3/1969 | Frachon | 338—28 X |

FOREIGN PATENTS 528,718  11/1940  Great Britain.

JOHN F. CAMPBELL, Primary Examiner

U.S. Cl. X.R.

29—615